United States Patent
Vendrow et al.

(10) Patent No.: US 9,306,899 B1
(45) Date of Patent: Apr. 5, 2016

(54) SYSTEM AND METHOD FOR DETERMINING PRESENCE BASED ON AN ATTRIBUTE OF AN ELECTRONIC MESSAGE

(71) Applicant: RingCentral, Inc., San Mateo, CA (US)

(72) Inventors: Vlad Vendrow, Redwood City, CA (US); Christopher Van Rensburg, Foster City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/633,953

(22) Filed: Feb. 27, 2015

(51) Int. Cl.
G06F 15/16 (2006.01)
H04L 12/58 (2006.01)
G06Q 10/10 (2012.01)
G06F 12/00 (2006.01)

(52) U.S. Cl.
CPC .............. H04L 51/34 (2013.01); G06Q 10/107 (2013.01); H04L 51/26 (2013.01); H04L 51/30 (2013.01)

(58) Field of Classification Search
USPC .......................... 709/206–207, 223–229, 250
See application file for complete search history.

(56) References Cited

U.S. PATENT DOCUMENTS

| | | | |
|---|---|---|---|
| 7,761,516 B2 | 7/2010 | Mason et al. | |
| 8,433,767 B2 | 4/2013 | Roskind et al. | |
| 2002/0160757 A1 | 10/2002 | Shavit et al. | |
| 2003/0045310 A1* | 3/2003 | Price | 455/466 |
| 2004/0177118 A1* | 9/2004 | Mason et al. | 709/206 |
| 2006/0075043 A1* | 4/2006 | Chen et al. | 709/206 |
| 2006/0168067 A1* | 7/2006 | Carlson et al. | 709/206 |
| 2007/0064883 A1* | 3/2007 | Rosenthal et al. | 379/67.1 |
| 2007/0074281 A1* | 3/2007 | Ikeda | 726/13 |
| 2011/0238435 A1* | 9/2011 | Rapaport et al. | 705/2 |
| 2012/0173633 A1* | 7/2012 | Balabhadrapatruni et al. | 709/206 |
| 2013/0097526 A1* | 4/2013 | Stovicek et al. | 715/752 |
| 2013/0212185 A1 | 8/2013 | Pasquero et al. | |
| 2013/0316746 A1* | 11/2013 | Miller et al. | 455/466 |
| 2013/0339453 A1* | 12/2013 | Aggarwal et al. | 709/206 |
| 2014/0019567 A1* | 1/2014 | Chen et al. | 709/206 |
| 2014/0164531 A1 | 6/2014 | Bastide et al. | |
| 2014/0181231 A1* | 6/2014 | Davenport et al. | 709/206 |
| 2014/0207880 A1 | 7/2014 | Malkin et al. | |

FOREIGN PATENT DOCUMENTS

GB 2461041 A 12/2009

* cited by examiner

*Primary Examiner* — Zarni Maung
(74) *Attorney, Agent, or Firm* — Finnegan, Henderson, Farabow, Garrett & Dunner LLP (57) ABSTRACT

Systems and methods are provided for determining a presence of an electronic message recipient based on an attribute of the electronic message, such as the content and/or context of the electronic message. The systems and methods can include acquiring, at a server, an electronic message from a sender, and determining an attribute of the electronic message. Based on the determined attribute, the server assigns an urgency level to the electronic message, which corresponds to a response time period. The server then monitors the recipient's device for a response to the electronic message, and to collect monitoring data about activity performed by the recipient on the device, or the environment surrounding the device. If the recipient does not respond within the response time period the server informs the sender a presence status of the recipient based on the monitoring data.

20 Claims, 8 Drawing Sheets

SYSTEM AND METHOD FOR DETERMINING PRESENCE BASED ON AN ATTRIBUTE OF AN ELECTRONIC MESSAGE

FIELD

The present disclosure generally relates to determining a presence status of a recipient of an electronic message.

BACKGROUND

Electronic messaging, such as text messaging, emails, chat messages, Short Message Service (SMS) messages, or voicemail, have become very popular and have replaced many live voice conversations between individuals. Many people use text-based electronic messaging even when they need a prompt response, even though the sender usually does not know whether the recipient is present at their electronic messaging device, and may not even know when the recipient will see the electronic message. Some electronic messaging systems indicate whether system users are idle or "away" (unavailable), based on a predetermined length of inactivity on the messaging device, a status manually set by the user, or based on the recipient's schedule or calendar appointments.

In some situations, electronic message senders desire to know whether recipients are present, as some electronic messages carry a higher sense of urgency or importance, and the sender expects a prompt response. A drawback of the current electronic messaging systems is that the sender may not have any indication of the recipient's presence because either the messaging systems do not provide a status, or because the predetermined idle time has not yet expired. Additionally, when a recipient views an electronic message but chooses to ignore the electronic message and not interact with the messaging device, whereby the sender may falsely believe that the recipient is not present.

An improved method and system for providing electronic message recipient presence statuses is desired.

SUMMARY

Disclosed embodiments provide systems and methods for determining a presence of an electronic message recipient based on an attribute of the electronic message.

Consistent with a disclosed embodiment, a method for determining a presence status of an electronic message recipient is provided. The method is performed by at least one processor and comprises acquiring an electronic message from a sender, determining an attribute of the electronic message, assigning an urgency level based on the determined attribute of the electronic message, providing the electronic message for delivery to a receiving device associated with the recipient, monitoring activity of the receiving device after the electronic message is delivered, and determining a presence status of the recipient based on the determined urgency level and the monitored activity.

Consistent with another disclosed embodiment, a system for determining a presence status of an electronic message recipient is provided. The system comprises one or more memories having stored thereon computer-executable instructions; and one or more processors configured to execute the stored instructions. The one or more processors are configured to acquire an electronic message from a sender, determine an attribute of the electronic message, assign an urgency level based on the determined attribute of the electronic message, provide the electronic message for delivery to a receiving device associated with the recipient, monitor activity of the receiving device after the electronic message is delivered, and determine a presence status of the recipient based on the determined urgency level and the monitored activity.

Consistent with other disclosed embodiments, non-transitory computer-readable storage media can store program instructions, which are executed by at least one processor device and perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DESCRIPTION OF THE EMBODIMENTS

The disclosed embodiments concern determining a presence of an electronic message recipient using a response time period determined based at least in part on an attribute of the electronic message, including the content and/or context of the electronic message. In one embodiment, an electronic messaging server analyzes an attribute of the electronic message and monitors the response time of the user. The response time is determined, in some embodiments, based on an attribute such as the content and/or context of the electronic message. Thus, an electronic message that explicitly requests a quick response, or contains an electronic message with an urgent context, causes the server to set a shorter response time for determining whether the recipient is present. If the recipient's response time exceeds a particular threshold associated with the determined attribute, the presence status of the user is set as unavailable and communicated to the sender.

In some embodiments, presence status is also determined based on activities other than the recipient responding to the electronic message. For example, the server can monitor the recipient's activities other than directly responding to the electronic message, such as contacting a third party (e.g., calling 911) when the electronic message relates to an emergency.

For purposes of explanation, the method steps are described herein as performed by an electronic messaging server, but in some embodiments the method steps are performed by a sender's electronic messaging device, a recipient's electronic messaging device, or distributed among the electronic messaging devices and electronic messaging server.

Other features and advantages of the present embodiments are discussed in further detail below with respect to the figures.

Figure 1:
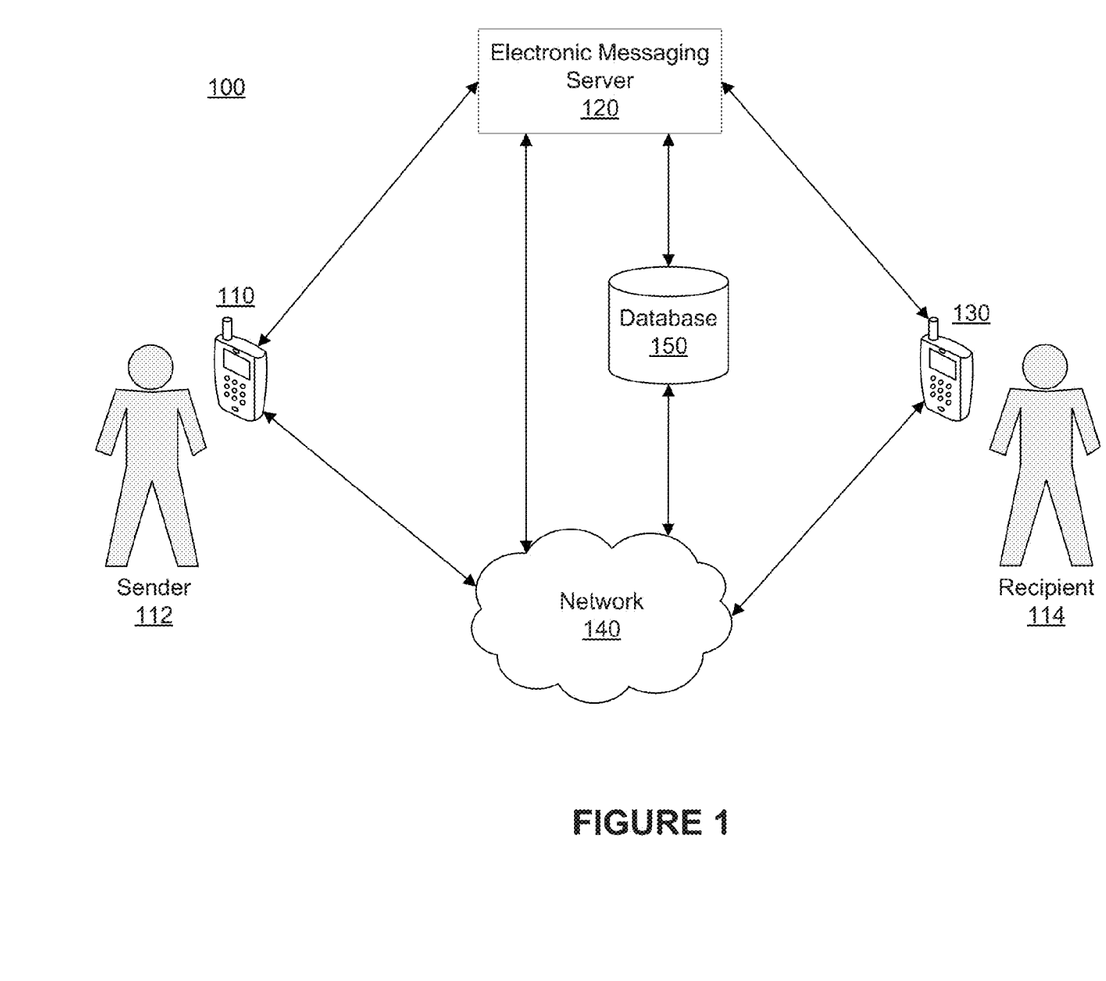
FIG. 1 is a diagram of a system for determining presence based on an attribute of an electronic message, consistent with the disclosed embodiments.

FIG. 1 is a diagram of a system 100 for determining presence based on the an attribute of an electronic message, consistent with disclosed embodiments. As shown in FIG. 1, system 100 can include sender electronic messaging device 110, electronic messaging server 120, recipient electronic messaging device 130, network 140, and database 150. A user such as sender 112 operates sender electronic messaging device 110, and a different user such as recipient 114 operates recipient electronic messaging device 130. The components and arrangements shown in FIG. 1 are not intended to limit the disclosed embodiments, as the system components used to implement the disclosed processes and features can vary.

Sender electronic messaging device 110 and recipient electronic messaging device 130 are computerized devices having at least data entry, data transmission, and data display capabilities. In some embodiments, one or more of sender electronic messaging device 110 and recipient electronic messaging device 130 are electronic devices such as, for example, smartphones, Personal Digital Assistants (PDAs), general purpose or notebook computers, mobile devices with computing ability, tablets, wearable devices such as Google Glass™ or smart watches, or any combination of these computers and/or affiliated components.

Electronic messaging server 120 (further described below) can be a computer-based system including computer system components, desktop computers, workstations, tablets, hand held computing devices, memory devices, and/or internal network(s) connecting electronic messaging server 120 components.

In some embodiments, system 100 components can communicate via network 140. Network 140 comprises any type of computer networking arrangement used to exchange data. For example, network 140 can be the Internet, a private data network, virtual private network using a public network, a satellite link, and/or other suitable connection(s) that enables system 100 to send and receive information between the components of system 100. Network 140 can also include a public switched telephone network ("PSTN") and/or a wireless network such as a cellular network, Wi-Fi network, or other known wireless network capable of bidirectional data transmission.

In some embodiments, one or more system 100 components can communicate directly with one another via a direct wired or wireless link. Such embodiments can also include a small-scale wired or wireless network (not shown in figure) such as a short range wireless network including Bluetooth™ or Wi-Fi, or a Local Area Network (LAN) or Wireless Local Area Network (WLAN). For example, sender electronic messaging device 110 can communicate with electronic messaging server 120 via a short-range Bluetooth™, rather than through the large-scale network 140. It is appreciated that different forms of sender electronic messaging device 110 and recipient electronic messaging device 130 can communicate with electronic messaging server 120 via one or more of the above-described communication schemes depending on the capabilities of the electronic message device, the configuration of the electronic messaging device 110, and the availability of network 140 in the vicinity of the respective device.

Database 150 can include one or more physical or virtual storages in communication with electronic messaging server 120. In some embodiments, database 150 stores data used in conjunction with the methods disclosed herein, including data generated by sender electronic messaging device 110, recipient electronic messaging device 130, and/or electronic messaging server 120. For example, database 150 can store one or more preferences, limits, thresholds, tables, associative arrays, and/or algorithms for determining an attribute such as a content and/or context of an electronic message, as well as data used by electronic messaging server 120 for assigning an urgency or priority level to the electronic message based on the determined attribute. In some embodiments, database 150 stores data associated with one or more presence status indications, such as a textual message, an image or graphic, or a sound, for providing to sender electronic messaging device 110 after determining a presence status of recipient 114. In some embodiments, database 150 stores a portion or an entirety of a received electronic message, as well as past electronic messages, for use by electronic messaging server 120 for functions such as improving one or more algorithms or techniques for determining an attribute of an electronic message, assigning an urgency to the electronic message, monitoring a recipient, determining a presence status, and/or providing a presence status indication.

In some embodiments, sender 112 assigns an urgency to the electronic message, by for example flagging or marking the electronic communication as urgent requiring prompt attention or response from recipient 114. In other example embodiments, an attribute of the electronic message is determined by aggregating a plurality of diverse contextual data relating to sender 112 to produce an electronic message urgency assignment. For example, sender 112 may be in a location where it is known by the electronic messaging server 120, from data available to electronic messaging server 120 via network 140 or sender electronic messaging device 110, that a crisis situation is occurring that affects the attribute of the electronic message. For instance, sender 112 may be stuck in his car on the freeway and electronic messaging server 120 is aware of a major accident that has cause multi-lane blockage ahead that has brought traffic to a standstill. With the availability of context information from sender 112's calendaring system, electronic messaging server 120 is aware that sender 112 is en route to attend an important meeting. Electronic messaging server 120 is also aware that recipient 114 of the electronic message composed by sender 112 is the organizer of the meeting for which sender 112 is likely to be late. With this aggregated context information, electronic messaging server 120 assigns an attribute indicative of the urgency of the electronic message to recipient 114.

The electronic message attribute may be determined based upon the relationship of sender 112 to recipient 114, which assessment may also take into account the mode of communication being used. For example, electronic messaging server 120 may have access to directory information, such as through LDAP integration with an organization's Active Directory database, and from this electronic messaging server 120 can detect that recipient 112 is a direct report to sender 114 within the organization and therefore the urgency of the electronic message should be elevated. If sender 112 is furthermore using a mode of communication that implies a higher level of priority, such as a telephone communication versus an e-mail communication, electronic messaging server 120 can assess the electronic message to be of a high priority for the benefit of recipient 114 whose manager (e.g., sender 112) is calling on the phone. Similarly, other context information relating to either sender 112 or recipient 114, such as location (for example electronic message being generated by a recipient at a hospital), biometric information, or the like can be taken into consideration in order to determine an attribute of the electronic message.

Figure 2:
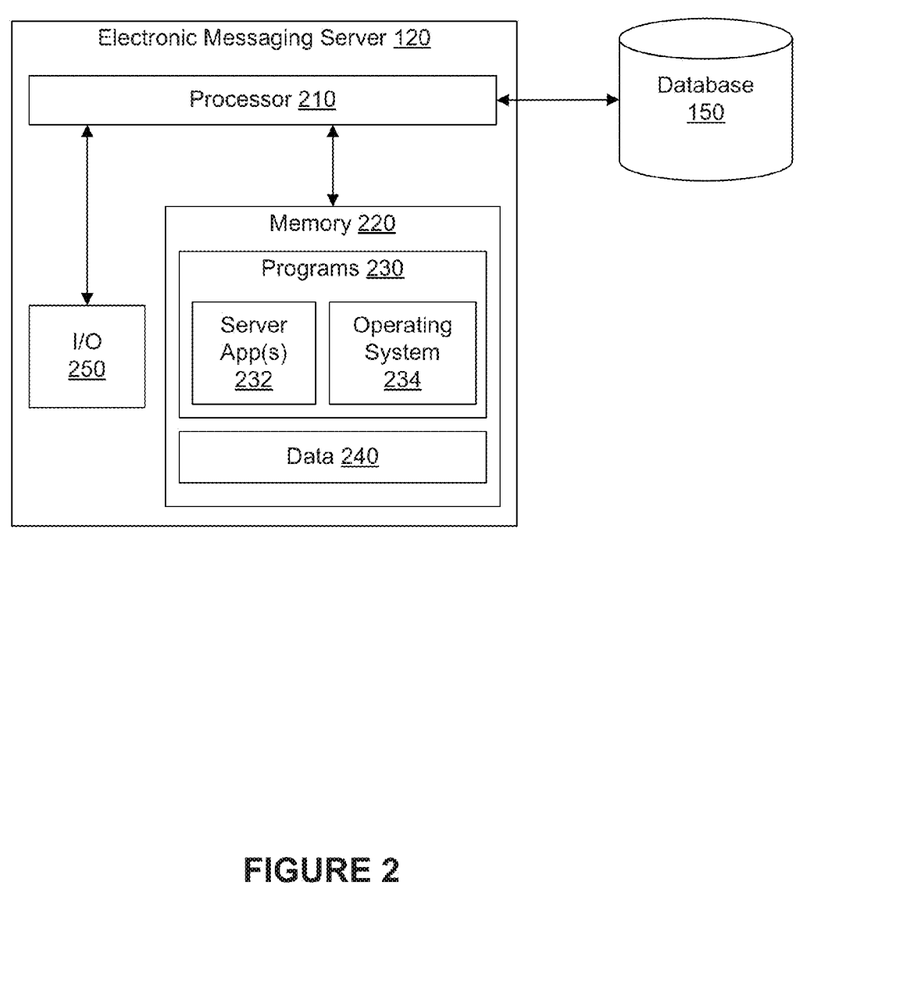
FIG. 2 is a diagram of an example of a server, consistent with the disclosed embodiments.

FIG. 2 shows a diagram of an example of electronic messaging server 120, consistent with the disclosed embodiments. As shown, electronic messaging server 120 can include one or more processors 210, input/output ("I/O") devices 250, and one or more memories 220 storing programs 230 including, for example, server app(s) 232, operating system 234, and storing data 240, and can communicate with a database 150 (which can be internal to or external from electronic messaging server 120). Electronic messaging server 120 can be a single server or can be configured as a distributed computer system including multiple servers or computers that interoperate to perform one or more of the processes and functionalities associated with the disclosed embodiments.

Processor 210 can be one or more processing devices configured to perform functions of the disclosed methods, such as one or more single core or multiple core processors executing parallel processes simultaneously. For example, processor 210 can be a single core processor configured with virtual processing technologies. In certain embodiments, processor 210 uses logical processors to simultaneously execute and control multiple processes. Processor 210 can implement virtual machine technologies, or other known technologies to provide the ability to execute, control, run, manipulate, store, etc. multiple software processes, applications, programs, etc. In another embodiment, processor 210 includes a multiple-core processor arrangement (e.g., dual, quad core, etc.) configured to provide parallel processing functionalities to allow electronic messaging server 120 to execute multiple processes simultaneously. In some embodiments, electronic messaging server 120 includes one or more specialized hardware, software, and/or firmware modules (not shown in figure) specially configured with particular circuitry, instructions, algorithms, and/or data to perform functions of the disclosed methods including, for example, determining an attribute of an acquired electronic message, assign an urgency level to the received electronic message, receive monitoring data from a recipient electronic messaging device, analyze the received monitoring data to determine a presence status of a recipient, and provide an indication of the recipient's presence status to a sender electronic messaging device. Such hardware, software, and/or firmware modules can form a portion of processor 210. It is appreciated that other types of processor arrangements could be implemented that provide for the capabilities disclosed herein.

Memory 220 can be a volatile or non-volatile, magnetic, semiconductor, tape, optical, removable, non-removable, or other type of storage device or tangible and/or non-transitory computer-readable medium that stores one or more executable program(s) 230 such as server apps 232 and operating system 234, and data 240. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Electronic messaging server 120 includes one or more storage devices configured to store information used by processor 210 (or other components) to perform certain functions related to the disclosed embodiments. For example, electronic messaging server 120 can include memory 220 that includes instructions to enable processor 210 to execute one or more applications, such as server applications 232, operating system 234, and any other type of application or software known to be available on computer systems. Alternatively or additionally, the instructions, application programs, etc. can be stored in an internal database 150 or external storage (e.g. cloud storage system) in direct communication with electronic messaging server 120 (not shown), such as one or more database or memory accessible over network 140. Database 150 or other external storage can be a volatile or non-volatile, magnetic, semiconductor, tape, optical, removable, non-removable, or other type of storage device or tangible and/or non-transitory computer-readable medium. Memory 220 and database 150 can include one or more memory devices that store data and instructions used to perform one or more features of the disclosed embodiments. Memory 220 and database 150 can also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, electronic messaging server 120 is communicatively connected to one or more remote memory devices (e.g., remote databases (not shown)) through network 140 or a different network. The remote memory devices can be configured to store information that electronic messaging server 120 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 230 include one or more software or firmware modules causing processor 210 to perform one or more functions of the disclosed embodiments. Moreover, processor 210 can execute one or more programs located remotely from account information display system 100. For example, electronic messaging server 120 can access one or more remote programs that, when executed, perform functions related to disclosed embodiments. In some embodiments, programs 230 stored in memory 220 and executed by processor(s) 210 can include one or more server app(s) 232 and operating system 234.

Server app(s) 232 cause processor 210 to perform one or more functions of the disclosed methods. For example, server app(s) 232 cause processor 210 to acquire an electronic message transmitted from sender electronic messaging device 110, determine an attribute of the electronic message, assign an urgency to the electronic message, provide the electronic message for delivery to a recipient electronic messaging device 130, monitor the recipient electronic messaging device 130, determine a presence of a recipient 114, and provide a presence status indication of the recipient 114 to the electronic message sender 112 via the sender electronic messaging device 110. Server app(s) 232 can include additional or fewer functions based on the configuration of system 100. In some embodiments other components of system 100 are configured to perform one or more functions of the disclosed methods. For example, sender electronic messaging device 130 can determine an attribute of an electronic message and assign an urgency level prior to sending the electronic message to electronic messaging server 120 and/or recipient electronic messaging device 130.

In some embodiments, program(s) 230 include operating systems 234 that perform known operating system functions when executed by one or more processors such as processor 210. By way of example, operating systems 234 include Microsoft Windows™, Unix™, Linux™, Apple™ operating systems, Personal Digital Assistant (PDA) type operating systems, such as Microsoft CE™, or other types of operating systems 234. Accordingly, disclosed embodiments can operate and function with computer systems running any type of operating system 234. Electronic messaging server 120 can also include communication software that, when executed by a processor, provides communications with network 140 and/ or a direct connection to one or more of sender electronic messaging device 110 and recipient electronic messaging device 130.

In some embodiments, data 240 includes, for example, contact information for an electronic message sender 112 and recipient 114, data correlating urgency levels with response time periods, and one or more tables, rule sets, algorithms, and/or associative arrays for correlating urgency levels with response time periods, and correlating activity and environmental data with presence statuses.

Electronic messaging server 120 can also include one or more I/O devices 250 having one or more interfaces for receiving signals or input from devices and providing signals or output to one or more devices that allow data to be received and/or transmitted by electronic messaging server 120. For example, electronic messaging server 120 can include interface components for interfacing with one or more input devices, such as one or more keyboards, mouse devices, and the like, that enable electronic messaging server 120 to receive input from an operator or administrator (not shown).

Figure 3:
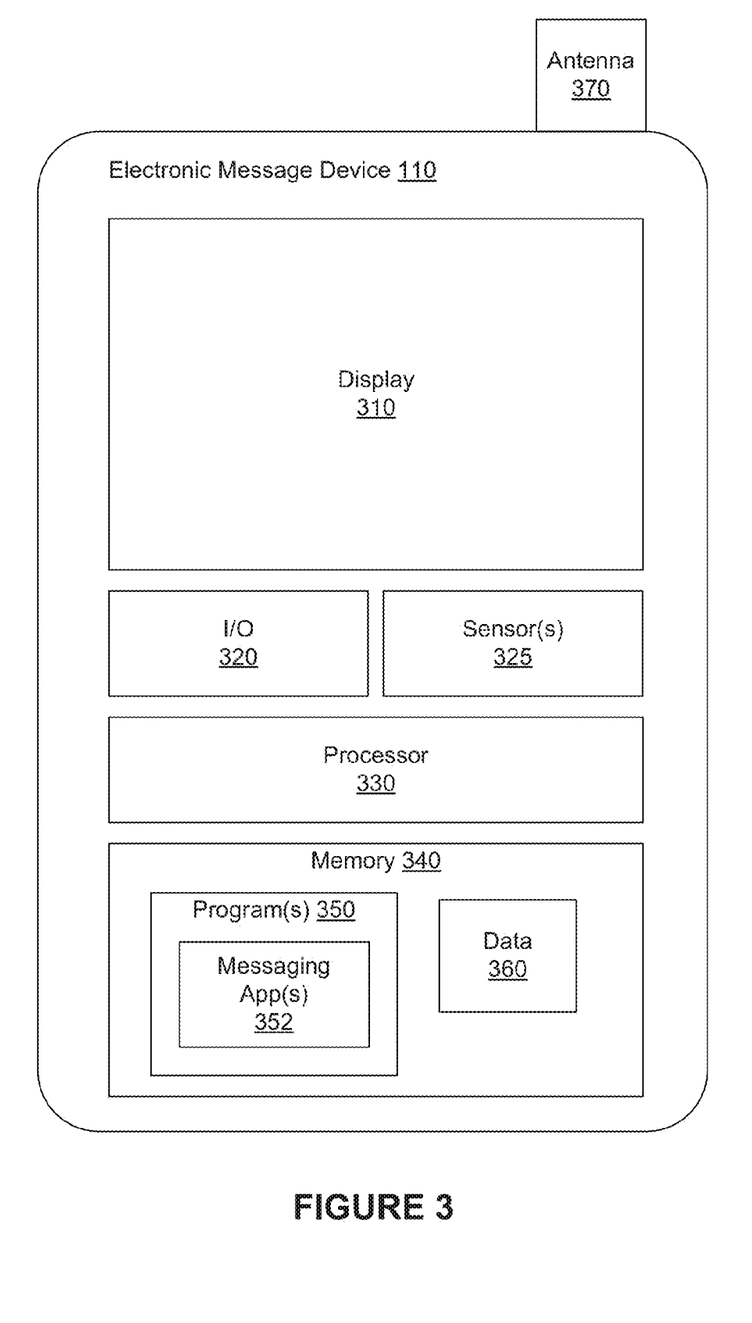
FIG. 3 is a component diagram of an example of an electronic message device, consistent with the disclosed embodiments.

FIG. 3 is a component diagram of a sender electronic messaging device 110. Recipient electronic messaging device 130 may have the same component configuration as sender electronic messaging device 110, or alternate component configurations. As shown, sender electronic messaging device 110 may include a display 310, input/output ("I/O") devices 320, one or more sensor 325, at least one processor 330, memory 340 having stored thereon one or more programs 350 and data 360, and an antenna 370.

Display 310 includes one or more devices for displaying information, including but not limited to, liquid crystal displays (LCD), light emitting diode (LED) screens, organic light emitting diode (OLED) screens, and other known display devices.

I/O devices 320 include one or more devices that allow electronic messaging device 110 to send and receive information. I/O devices 320 may include, for example, a keyboard, buttons, switches, and/or a touchscreen panel, integrated with display 310 in some embodiments. I/O devices 320 may also include one or more communication modules (not shown) for sending and receiving information via antenna 370 from other components in system 100 by, for example, establishing wired or wireless connectivity between sender electronic messaging device 110 to network 140, by establishing direct wired or wireless connections between sender electronic messaging device 110 and electronic messaging server 120, or between sender electronic messaging device 110 and recipient electronic messaging device 130. Direct connections may include, for example, Bluetooth™, Bluetooth LE™, WiFi, near field communications (NFC), or other known communication methods which provide a medium for transmitting data between separate devices.

Sensor(s) 325 include one or more devices for collecting data about sender electronic messaging device 110 and the environment surrounding sender electronic messaging device 110 such as, for example, a Global Positioning System (GPS) sensor, an ambient light sensor, an orientation sensor, an accelerometer, an altitude sensor, and other sensors indicative of the device and its surroundings.

Processor(s) 330 include one or more known computing devices, such as those described with respect to processor 210 in FIG. 2.

Memory 340 includes a volatile or non-volatile, magnetic, semiconductor, tape, optical, removable, non-removable, or other type of storage device or tangible and/or non-transitory computer-readable medium that stores one or more executable program(s) 350, such as messaging app 352, and data 360. Data 360 can include, for example, sender 112's personal information, account information, and display and messaging settings and preferences.

In some embodiments, program(s) 350 include operating systems (not shown) that perform known operating system functions when executed by one or more processors. By way of example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system. Sender electronic messaging device 110 may also include communication software that, when executed by a processor, provides communications with network 140, such as Web browser software, tablet, or smart hand held device networking software, etc. Sender electronic messaging device 110 may be a device that executes mobile applications for performing operations consistent with disclosed embodiments, such as a tablet or mobile device.

Program(s) 350 also includes messaging app(s) 352, such as an email client, instant electronic message, and/or Short Messaging Service (SMS) app, which when executed causes sender electronic messaging device 110 to perform processes related to generating and transmitting an electronic message from sender 112 to recipient 114. For example, messaging app(s) 352 can configure sender electronic messaging device 110 to perform operations including: generating and displaying a user interface for creating and sending an electronic message; receiving input from sender 112 via I/O devices 320 and processing the received input to create the electronic message; sending the electronic message; receiving a presence status indicator; and providing the presence status indicator. In some embodiments, messaging apps 352 can also configure sender electronic messaging device 110 to determine an attribute of the electronic message, such as a content and/or context of the electronic message, and assign an urgency level to the electronic message. In some embodiments, messaging app(s) 352 can configure recipient electronic messaging device 130 to perform operations including: generating and displaying a user interface responsive to a received electronic message; monitor and providing activity and environmental data to electronic messaging server 120; receiving input associated with a response to the electronic message; and transmitting the response. In some embodiments, messaging apps 352 can also configure recipient electronic messaging device 130 to analyze monitored activity and environmental data to determine a presence status of recipient 114, and provide a presence status indicator to electronic messaging server 120 and/or sender electronic messaging device 110.

FIGS. 4A-4E are flowcharts of an example of a method 400 for determining presence based on an attribute of an electronic message, consistent with the disclosed embodiments. It is appreciated that one or more processors of electronic messaging server 120, such as processor 210, can perform method 400. In some embodiments, one or more devices other than electronic messaging server 120 can perform one or more steps of method 400, such as, for example, sender electronic messaging device 110 and/or recipient electronic messaging device 130.

Figure 4A:
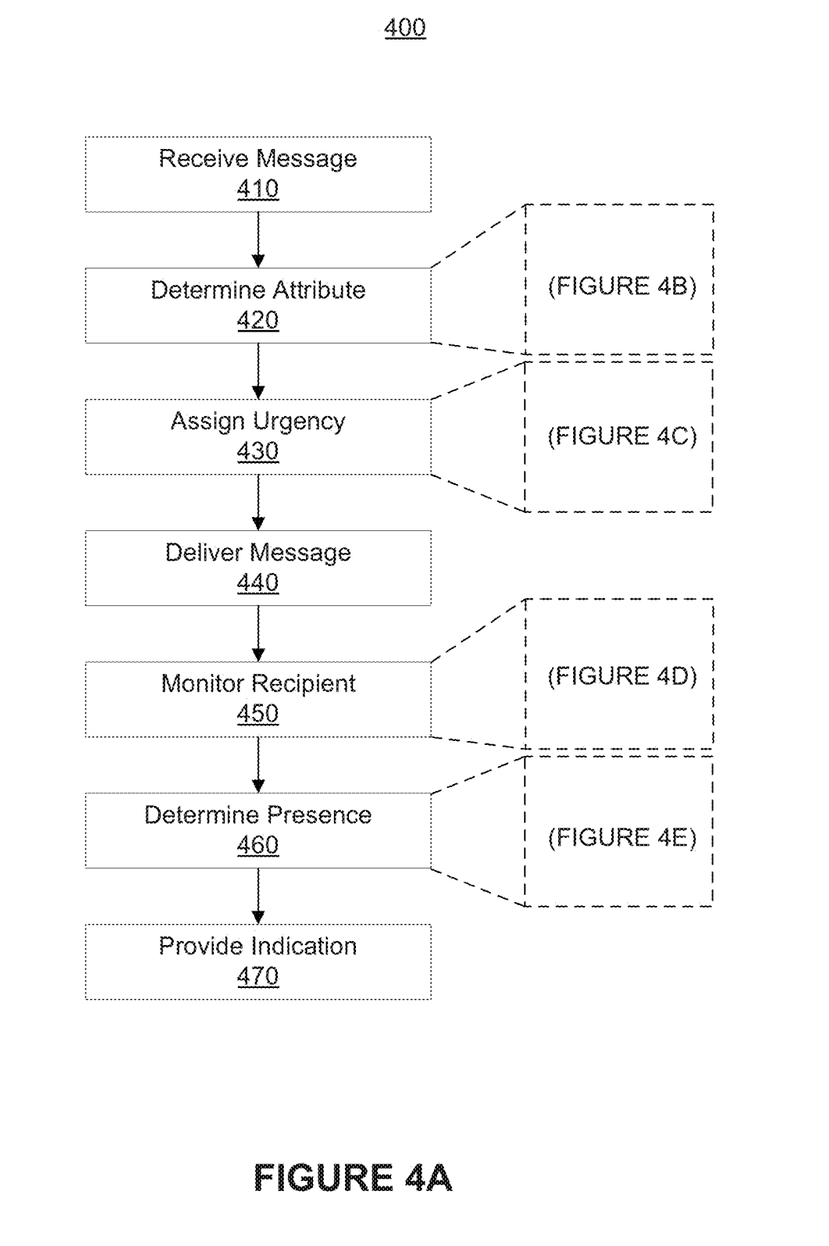
FIGS. 4A-4E are flowcharts of an example of a method for determining presence based on an attribute of an electronic message, consistent with the disclosed embodiments.

As shown in FIG. 4A, method 400 can begin in step 410, when electronic messaging server 120 acquires an electronic message transmitted from sender 112's electronic messaging device 110. The electronic message may originate from sender electronic messaging device 110 in response to input from sender 112, and electronic messaging server 120 can intercept or receive the electronic message before recipient electronic messaging device 130 receives the electronic message.

In step 420, electronic messaging server 120 can determine an attribute of the acquired electronic message. In some embodiments, the attribute includes the content and/or a context of the acquired electronic message. In some embodiments, the electronic message "content" comprises, for example, the characters, letters, symbols, numbers, words, and phrases in the body of the electronic message, and the "context" comprises, for example, one or more circumstances or inferences associated with one or more words or numbers included in the body of the electronic message. In some embodiments, content also includes a subject line or heading of the electronic message. Electronic messaging server 120 can determine the content of the electronic message by analyzing at least one of the characters, symbols, words, number groups, and word and number strings in the electronic message. In some embodiments, processor 210 can also determine the definitions of words in the acquired electronic message. In some embodiments, electronic messaging server 120 can determine the context of the acquired electronic message by parsing the content and analyzing meanings of words, phrases, symbols, and/or numbers in the electronic message for determining the context. For example, electronic messaging server 120 can determine that an electronic message might require a prompt response when the electronic message includes the phrase "right away," in close proximity to the terms "respond," "reply," "answer," "decision," etc.

In step 430, electronic messaging server 120 can assign an urgency to the electronic message, such as a quantitative or qualitative urgency index level, based at least in part on the determined attribute of the acquired electronic message.

In some embodiments, processor 330 of sender electronic messaging device 110 can perform one or more of steps 410-430, prior to providing the electronic message for delivery to recipient electronic messaging device 130.

In step 440, electronic messaging server 120 provides the electronic message for delivery to recipient electronic messaging device 130. In some embodiments, recipient electronic messaging device 130 receives the delivered electronic message directly from sender electronic messaging device 110 through a direct link. In such embodiments, processor 330 of sender electronic messaging device 110 can perform one or more of steps 410-430, and processor 330 of recipient electronic messaging device 130 can perform one or more of steps 410-430. In other embodiments, electronic messaging server 120 can provide the electronic message for delivery to recipient electronic messaging device 130 directly or via one or more intermediary devices.

In step 450, electronic messaging server 120 monitors the presence of recipient 114, by monitoring activity and/or environmental data associated with recipient electronic messaging device 130.

In step 460, electronic messaging server 120 determines a presence status of recipient 114, based on the monitored data. In some embodiments, processor 330 of recipient electronic messaging device 130 can determine the presence status internally, and transmit the determined status (step 470) to electronic messaging server 120 and/or sender electronic messaging device 110. In some embodiments, sender electronic messaging device 110 can determine a presence status of recipient 114, by receiving and analyzing the monitored data.

In some embodiments, steps 420, 430, 450, and/or 460 can be performed using one or more modules, which can be packaged functional hardware units designed for use with other components or a part of a program, such as server applications 232, that performs a particular function, corresponding to the particular step, of related functions.

In step 470, electronic messaging server 120 provides the determined presence status indication to sender electronic messaging device 110, for presentation to sender 112. In some embodiments, presence status indications may include a simple binary visual indicator of whether the recipient is determined to be "present" or "not present." In other embodiments, presence status indicators may include additional information, such contextual information about the recipient based on activity and environmental data collected about recipient electronic messaging device 130. For example, if recipient electronic messaging device 130 is moving quickly and recipient 114 is not interacting with recipient electronic messaging device 130 (or only interacting via hands free accessories), a presence status indicator can inform sender 112 that recipient 114 is likely traveling in a car or vehicle. As another example, if recipient electronic messaging device 130 does not receive any input from recipient 114 in response to a plurality of incoming messages during a period of time, a presence status indicator can inform sender 112 that recipient is likely busy or travelling. Sender electronic messaging device 110 receives the presence status indication (not shown in figure), and convey recipient 114's presence status to sender 112, such as by providing a visual indicator, an audible indicator, a combination of visual and audible indicators, or any other suitable method for indicating presence status.

Figure 4B:
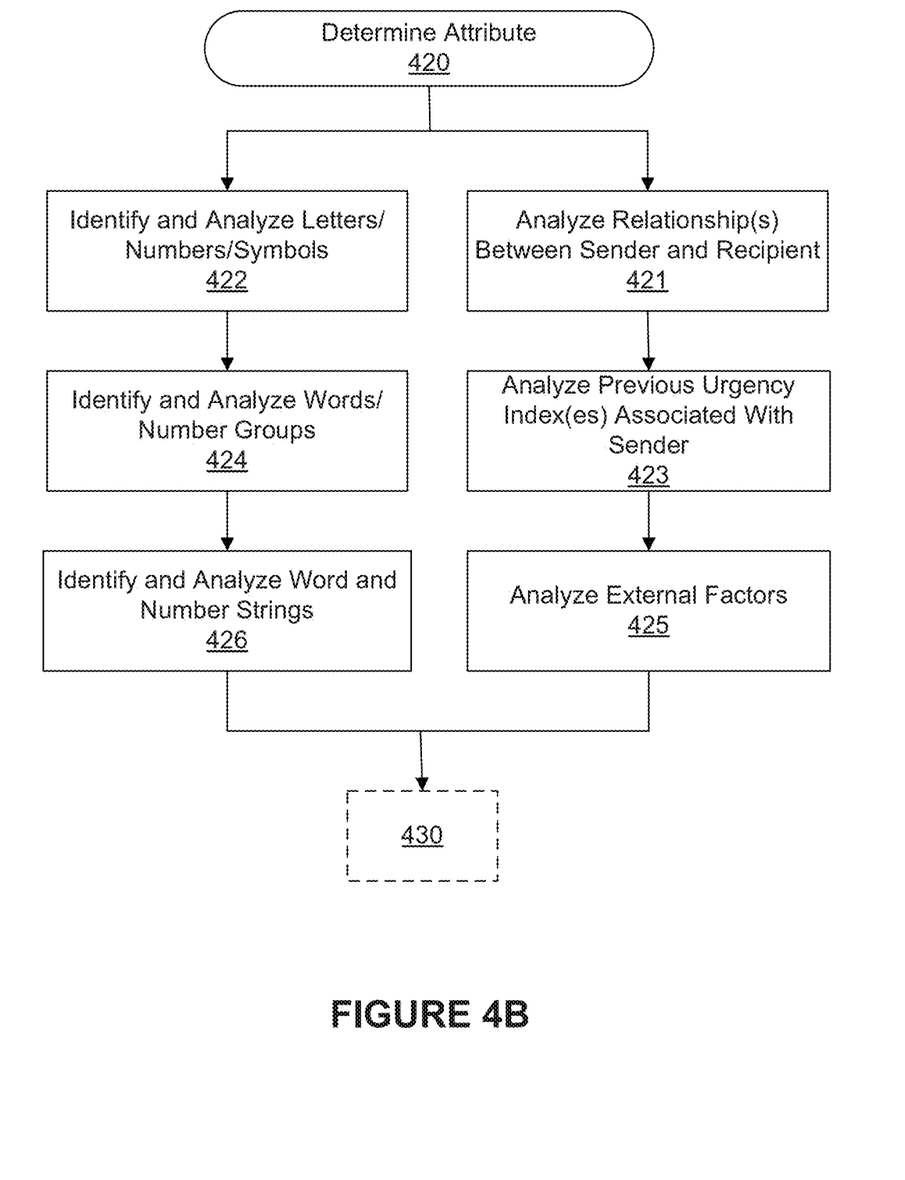

FIG. 4B is a flowchart illustrating substeps that electronic messaging server 120 can perform in conjunction with determining an attribute (step 420). As shown, determining an attribute (step 420) can include determining a content and/or context of the acquired electronic message, by analyzing letters, numbers, and/or symbols (step 422), analyzing words and/or number groups (step 424), and analyzing strings of words and/or numbers (step 426). It is to be understood that the steps can be performed in a different order than depicted in FIG. 4B, such as analyzing strings of words and/or numbers (step 426) first, followed by analyzing words and/or number groups (step 424) and then analyzing letters, numbers, and/or symbols (step 422). At the completion of step 420, method 400 can proceed to step 430.

As previously discussed, a "content" of the electronic message comprises at least one of the characters, symbols, words, number groups, and word and number strings identified in the electronic message. In some embodiments, the electronic message can include images, audio, and video data. In such embodiments, the electronic message content can also include spoken words and messages of the audio data, identifiable sounds of the audio data, and objects or words identified in the video and image data. In some embodiments the electronic message content can also include one or more definitions of words in the acquired electronic message. A "context" of the electronic message can include one or more determined circumstances or inferences associated with the identified content of the electronic message. Thus, electronic messaging server 120 can determine a content of the electronic message and determine at least one context of the electronic message based at least in part on the determined content.

In some embodiments, electronic messaging server 120 uses one or more available character and character group recognition algorithms (either known or later developed algorithms) to determine a content of the acquired electronic message. Processor 210 can employ one or more of a rules-based analysis, lookup tables, associative arrays, learning machine algorithms, or any other suitable analysis techniques for determining a context of the electronic message. Electronic messaging server 120 can store algorithms and/or data used in conjunction with the substeps in FIG. 4B in database 150, as data 240 in memory 220, or as data 360 in memory 340 of at least one of electronic messaging devices 110 or 130.

In step 422, electronic messaging server 120 identifies and analyzes the characters of the written electronic message, such as alphanumeric characters including letters and numbers, and/or symbols. Electronic messaging server 120 identifies the literal content of each character, and analyzes the content to determine any contextual aspects associated with the characters. For example, although the letter "a" by itself may not have a significant meaning, the symbol "!" is indicative of an excited statement and possibly a sense of urgency. Additionally, the character "?" indicates that sender 112 is questioning recipient 114, and likely expects a response, and thus indicates that the electronic message probably has a higher level of urgency than an electronic message with no questions. In some embodiments, the electronic message content also includes typographical errors recognized as misplaced punctuation. For example, electronic messaging server 120 can identify and flag erroneous periods, commas, apostrophe's, etc., located in the middle of a word (adjacent to two alphanumeric characters), or duplicate punctuation marks. An electronic message containing multiple typographical, grammatical, and/or spelling errors can indicate that sender 112 rushed or hurried to compile and send the electronic message, and that the electronic message could have an increased importance or urgency. Thus, electronic messaging server 120 can associate a more urgent context with an electronic messaging having a significant amount of misplaced punctuation, misplaced punctuation, spelling, and grammatical errors (discussed below) throughout the electronic message.

In step 424, electronic messaging server 120 identifies and analyzes words and/or groups of numbers, to recognize particular words or numbers of importance. In some embodiments, electronic messaging server 120 uses one or more known techniques for identifying words and/or number groups in the acquired electronic message, to identify its literal content. Electronic messaging server 120 can then analyze the identified content to determine any contextual aspects associated with the words and/or number groups. For example, an electronic message may include certain cue words indicative of a context such as a requested response, such as "respond," "answer," "response," "decision," "reply," etc., or may include numbers related to a deadline or request, such as "5:00 PM." As another example, an electronic message may include cue words indicative of urgency, such as "emergency," "urgent," "quickly," "rush," "immediate," etc. In some embodiments, electronic messaging server 120, and/or database 150, stores lists of previously identified cue words and numbers to identify, and server electronic messaging 120 can continuously update word and number lists over time to improve system accuracy. In some embodiments, the electronic message content also includes typographical errors recognized as misspelled words. Electronic messaging server 120 can associate a more urgent context with an electronic message having a significant number of misspelled words (such as greater than 50% of the electronic message words misspelled). In some embodiments, electronic messaging server 120 can receive historical data regarding sender 112's average typing accuracy and/or an average accuracy for a population, and compare an amount of typographical errors in the acquired electronic message to the received historical data, to determine whether the acquired electronic message has an above-average amount of typographical errors. In step 426, electronic messaging server 120 identifies and analyzes strings of words and/or numbers. In some embodiments, electronic messaging server uses one or more known techniques for identifying groups or strings of adjacent words and/or numbers, to identify the literal content of the acquired electronic message. Electronic messaging server 120 can then analyze the identified content to determine any contextual aspects associated with the number/word strings. Similar to step 424, processor 210 searches for phrases indicative of urgency or a requested response. For example, electronic messaging server 120 can search the acquired electronic message for cue phrases, such as "respond by 5:00 PM," or "call 911." In some situations, for example, electronic messaging server 120 may determine that a cue word identified in step 424 does not convey urgency in step 426. For example, although electronic messaging server 120 may identify the word "rush" in an electronic message in step 424 as an urgent word, in step 426 electronic messaging server 120 may determine that the electronic message recites "no rush," and therefore is not an urgent electronic message. In some embodiments, electronic messaging server 120 may employ one or more learning algorithms to improve system accuracy over time, to reduce the number of false positive identifications of urgent electronic messages. In some embodiments, the electronic message content includes typographical errors recognized as grammatical errors such as duplicate words, missing words in a structured or semi-structured phrase, and any other detectable grammatical errors in strings of words and/or numbers. Electronic messaging server 120 can associate a more urgent context with an electronic message having a higher-than-average amount of grammatical errors, based on a comparison with historical data for sender 112 and/or a population average.

In some embodiments, the acquired electronic message can comprise a multimedia message including one or more of audio, image, or video data, such as a voicemail, video message, or picture message. Electronic messaging server 120 can analyze the acquired electronic message to transcribe audio data to text, and extract recognizable characters, words, and strings from image and video data. Electronic messaging server 120 can then analyze transcribed text to ascertain a context of the electronic message. In some embodiments, electronic messaging server 120 can also compare audio, video, and image data to predefined sounds, images, video clips, volume patterns, luminance patterns, and any other predefined reference data associated with one or more contexts. For example, electronic messaging server 120 can determine whether a voicemail message includes any audio data indicative of a siren, or a distressed or shouting voice, indicative of an urgent message with an emergency context.

In some embodiments, the determined context of the acquired electronic message includes a topic of the electronic message. For example, electronic messaging server 120 can determine one or more topics of the electronic message based on the analysis of words (step 424) and/or strings of words (step 426), to identify topic words or phrases. Electronic messaging server 120 can compare the identified words and/or strings of words to one or more associative arrays that correlate words/strings with topics, to determine a topic of the electronic message such as, for example, "business," "work," "family," "personal."

In some embodiments, electronic messaging server 120 determines a context of the acquired electronic message based in part on one or more factors associated with the acquired electronic message. For example, electronic messaging server 120 can analyze one or more relationships between sender 112 and recipient 114 (step 421), analyze a history of urgency indexes of previous electronic messages from sender 112 (step 423), and/or analyze other external factors (step 425).

In step 421, electronic messaging server 120 analyzes one or more relationships existing between sender 112 and recipient 114. The relationship(s) can be determined, for example, using contact information in sender 112's or recipient 114's contact lists. For example, electronic messaging server 120 can determine that sender 112 is recipient 114's parent, if recipient 114's contact list includes an entry for sender 112 with a label such as "mom." As another example, electronic messaging server 120 can determine that sender 112 is recipient 114's manager or supervisor, if a contact list entry for sender 112 includes a managerial job title, and also includes a same company that employs recipient 114. In such examples, electronic messaging server 120 can associate a more urgent message context based on the preexisting relationship between sender 112 and recipient 114. In some embodiments, a preexisting relationship can be determined based on the electronic message content. For example, if sender 112 signs a message "Mom," or addresses the message as "Dear Son," electronic messaging server 120 can infer that sender 112 and recipient 114 are related as mother and son. In some embodiments, electronic messaging server 120 can infer a close preexisting relationship when either sender 112 or recipient 114 appears within a "favorites" subset of the other's contact lists.

In some embodiments, electronic messaging server 120 combines one or more factors to determine a context, such as by combining a relationship between sender 112 and recipient 114 with a context of the message words and/or word strings. For example, if sender 112 is the father of a child and sends an electronic message to recipient 114 who is the mother of the child, the known relationship of the sender to the recipient can be used along with a context of the electronic message content to determine whether the electronic message has an emergency or important context.

In some embodiments, electronic messaging server 120 can use a determined relationship between sender 112 and recipient 114 to determine a topic of the acquired electronic message. For example, if electronic messaging server 120 determines that sender 112 and recipient 114 are related as parent and child, electronic messaging server 120 can determine that the electronic message topic is likely a personal message related to family matters. As another example, if electronic messaging server 120 determines that sender 112 and recipient 114 are related as employee and supervisor, then electronic messaging server 120 can determine that the electronic message topic is likely business-related.

In step 423, electronic messaging server 120 can analyze one or more urgency levels associated with previous electronic messages acquired from sender 112. Electronic messaging server 120 can determine whether any statistical trend exists in sender 112's previous messages, which may indicate a probability that the current acquired electronic message is urgent or not urgent. For example, if previous electronic messages from sender 112 are generally high urgency messages, such as emergency messages or those requesting an immediate reply, electronic messaging server 120 can infer that a new message from sender 112 is likely urgent.

In step 425, electronic messaging server 120 can analyze one or more other external factors that are indicative of a context of the electronic message. For example, electronic messaging server 120 can analyze one or more calendars associated with sender 112 and/or recipient 114, and determine if the acquired message is associated with any upcoming appointments or events in the one or more calendars. For example, electronic messaging server 120 can determine whether sender 112 and recipient 114 are listed as participants in a teleconference scheduled to begin proximate to a timestamp of the acquired electronic message. As another example, if sender 112 is a coworker or family member to recipient 114, and sender 112 is scheduled to attend a work or family event proximate to the acquired electronic message timestamp, electronic messaging server 120 can determine that recipient 114 is likely involved in the scheduled event, and that the electronic message is urgent based on the upcoming event.

As another example, sender 112 may be at a critical meeting with a potential business partner, and electronic messaging server 120 can determine, based on an event entry in a calendaring system, that sender 112 is attending a meeting tagged as having high importance at the time of sending the acquired electronic message. If recipient 114 is also identified as an attendee of the meeting in the event entry, then electronic messaging server 120 can determine that the electronic message has a similar urgency or importance index as that of the meeting of which both sender 112 and recipient 114 are attendees. Thus, electronic messaging server 120 can associate recipient 114 with a known event for sender 112, or associate the acquired electronic message with a known urgency or importance index for a scheduled event.

Referring still to step 425, in some embodiments electronic messaging server 120 can determine a context of the acquired electronic message based in part on a location of sender 112 and sender messaging device 110 at the time the electronic message was sent. In such embodiments, the context for the electronic message is a geo-location associated with the electronic message and the level of urgency that the geo-location implies. For example, electronic messaging server 120 can receive time stamped location data associated with sender messaging device 110 using one or more known locating methods such as Global Positioning System (GPS) or cellular triangulation tracking. Electronic messaging server 120 can determine the location of sender 112 at the time the acquired electronic message was sent by comparing a timestamp of the electronic message to the time stamped location data. Electronic messaging server 120 can then determine whether sender 112's location is associated with a determinable context, by identifying a name or type of the location. For example, if the determined location is a hospital or a child's school, electronic messaging server 120 can determine that the electronic message is probably urgent or associated with an emergency requiring recipient 114's immediate attention.

Referring still to step 425, in some embodiments electronic messaging server 120 can receive biometric measurement data from one or more biometric devices associated with sender 112, such as wearable fitness or health management devices capable of detecting one or more of an elevated heart rate, blood pressure level, elevated galvanic skin response, pupil dilation, increased breathing rate, or any other biometric measurement indicative of a stress level of sender 112 at the time of creating and sending the electronic message. Electronic messaging server 120 can analyze the biometric data to determine a stress level of sender 112, and determine a context of the electronic message based on the determined stress level.

Additionally, a messaging system could potentially monitor the speed with which the sender is compiling an electronic message this information could be conveyed along with the electronic message as an attribute that can be optionally used by other systems to perform a richer analysis of the electronic message. To this end, qualities of the sender at the time of formulating a electronic message can be recorded and encoded into the electronic message as attributes, such qualities including a measurement of stress level as determined from biometric sensors that may be tethered to a mobile device being used to send the electronic message, and such biometric sensors including wearable fitness or health management devices that measure heart rate, blood pressure, or other properties of the sender.

Figure 4C:
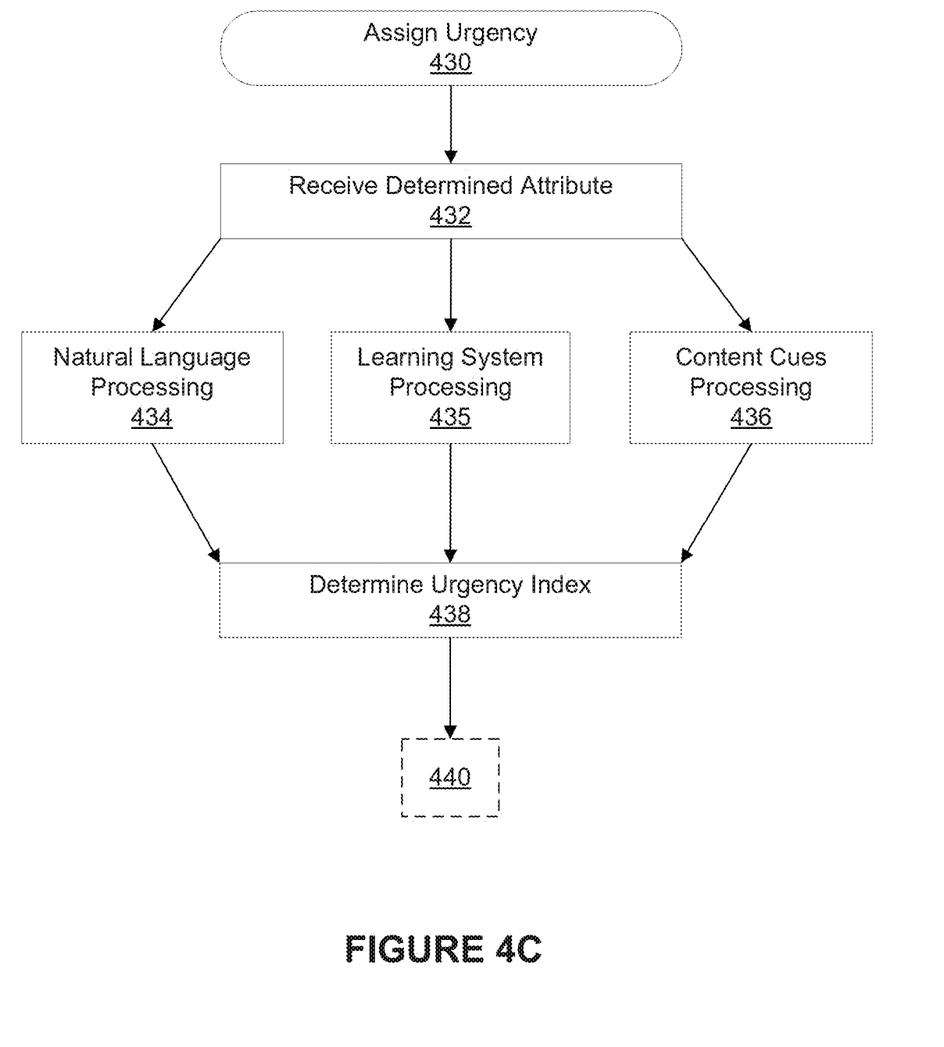

After completing at least one of steps 421-426, method 400 proceeds to 430, an example embodiment of which is illustrated in FIG. 4C, to assign an urgency level to the electronic message based on the determined attribute.

As shown in FIG. 4C, in step 432 electronic messaging server 120 receives information associated with the determined attribute from step 420. In some embodiments, electronic messaging server 120 performs both steps 420 and 430. In other embodiments, sender electronic messaging device 110 determines the electronic message attribute, and transmits the associated information with the outgoing electronic message. In some embodiments, the associated information includes, for example, an index of the characters, letters, symbols, numbers, words, and phrases in the electronic message (the "content"), and determined circumstances or inferences associated with one or more words, numbers, or objects included in the electronic message (the "context"), as determined in step 420.

Electronic messaging server 120 analyzes the determined attribute, such as a determined content/context, using one or more of natural language processing (step 434), learning system processing (435), and/or content cues processing (436) to determine a level of urgency associated with the electronic message. For example, in some embodiments electronic messaging server 120 analyzes sentences in the electronic message to ascertain the tone of the electronic message using natural language processing (434). Electronic messaging server 120 can perform steps 434, 435, and/or 436 simultaneously in parallel (as shown in figure), or sequentially in series (not shown in figure). In some embodiments, electronic messaging server 120 also identifies cue words from the electronic message content, which can identify the electronic message as urgent. Electronic messaging server 120 can also automatically update its analysis methods using previous success rates for determining electronic message urgency (learning system processing 435), to improve accuracy in identifying cue words, sentences, and symbols.

In step 438, electronic messaging server 120 determines an urgency index for the acquired electronic message, based on the analyses performed in steps 434, 435, and/or 436, and based in part on one or more analysis results from steps 421-426. In some embodiments, to determine an urgency index, electronic messaging server 120 can score one or more of cue words or symbols in the electronic message, circumstances (contexts) inferred from the electronic message content, or external factors associated with the electronic message. In other embodiments, electronic messaging server 120 can apply one or more rule sets to the analysis results, to determine an urgency index for the electronic message. In some embodiments, the urgency index is a relative numeric value on an urgency scale, such as "1-10," where 10 is the highest urgency level and 1 is the lowest urgency level. In other embodiments, the urgency index is a qualitative label such as "low urgency," "medium urgency," and "high urgency." Various forms of urgency indexes may be assigned to the electronic message, as long as electronic messaging server 120 can ascertain an appropriate response time period related to the electronic message attribute.

In some embodiments, electronic messaging server 120 can also analyze one or more previous communications from sender 112, to detect one or more patterns indicative of an elevating of level of urgency. For example, electronic messaging server 120 can determine that sender 112 has sent an abnormally high number of messages within a particular timeframe, or that sender 112 has recently resent a previous electronic message, either exactly or in a paraphrased or otherwise repeated form, indicating that sender 112 is sending frequent repeated requests for a response from recipient 114. In such embodiments, electronic messaging server 120 can increase an urgency level of the acquired electronic message to reflect sender 112's behavior patterns.

After determining an urgency index (step 438), method 400 proceeds to step 440, and provide the electronic message for delivery to recipient electronic messaging device 130. In some embodiments having an alternate order of method 400 steps, electronic messaging server 120 can perform step 430 immediately after the electronic message is delivered.

Figure 4D:
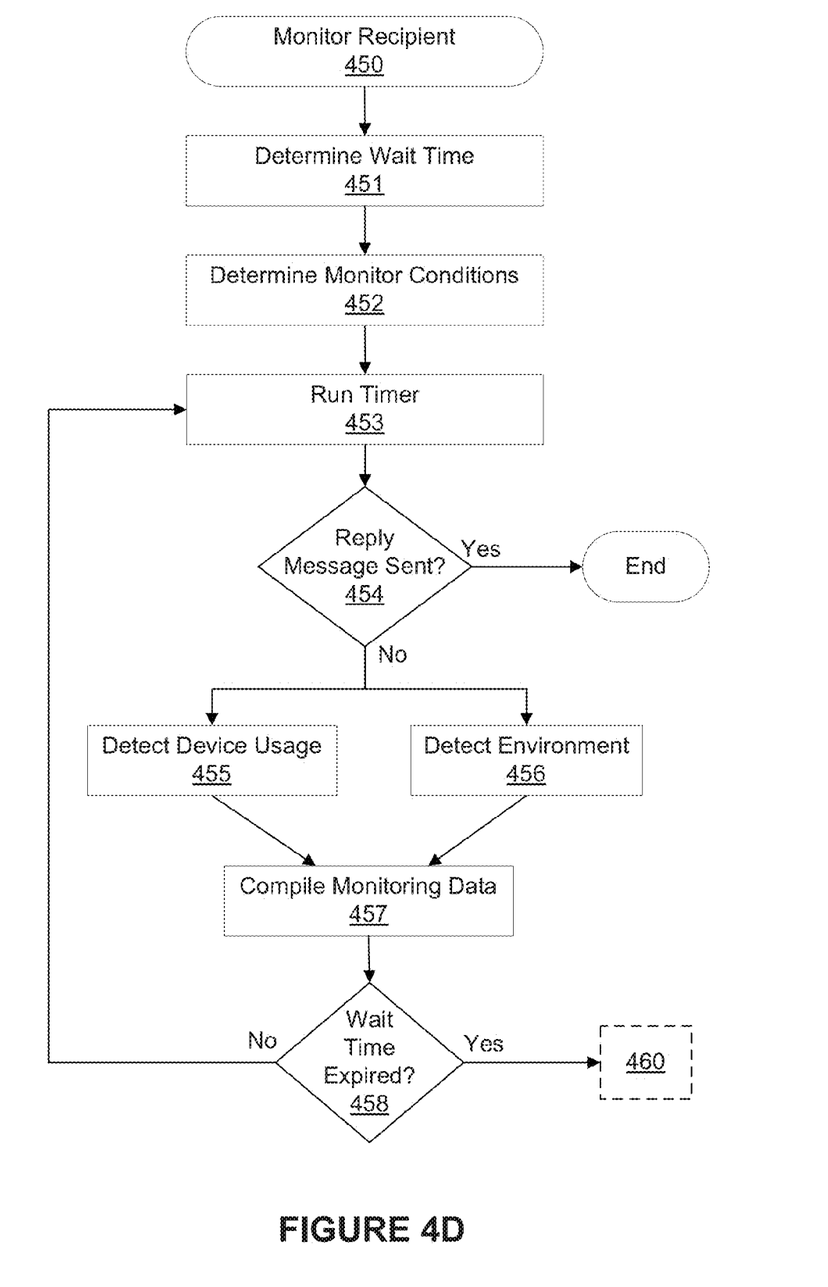

FIG. 4D illustrates an example of step 450, in which electronic messaging server 120 monitors recipient 114 presence by monitoring recipient electronic messaging device 130.

In step 451, electronic messaging server 120 determines a wait time, such as a response time period associated with the electronic message. In some embodiments, a length of the wait time is inversely proportionate to the determined electronic message urgency. For example, electronic messaging server 120 can determine a five minute wait time for an electronic message that is not urgent, and can determine a 15 second wait time for an electronic message that is very urgent. Thus, as urgency level increases, wait time can decrease.

In step 452, electronic messaging server 120 determines one or more conditions for monitoring recipient electronic message device 130. In some embodiments, monitor conditions include, for example, types of activity and environmental data to collect and analyze for recipient electronic messaging device 130. Monitor conditions may be determined based on the capabilities of recipient electronic messaging device 130, predefined preference settings by sender 112, and/or predefined preference settings by recipient 114.

In step 453, electronic messaging server 120 runs a timer to count up from zero to the determined wait time, or down from the determined wait time to zero.

In step 454, electronic messaging server 120 determines whether recipient 114 has sent a reply electronic message from recipient electronic messaging device 130. If a reply electronic message has been sent ("yes" in step 454), method 400 ends, because recipient 114 replied to sender 112 within the wait time corresponding to the electronic message urgency level, and thus recipient 114 is considered "present/available." If a reply electronic message has not been sent ("no" in step 454), then method 400 proceeds to detect recipient electronic messaging device 130 usage (step 455), and detect the environment around recipient electronic messaging device 130 (step 456).

In step 455, electronic messaging server 120 collects activity data from recipient electronic messaging device 130 corresponding to device usage occurring after delivery of the electronic message and during the wait time period such as, for example, keystrokes and input received on recipient electronic messaging device 130 from recipient 114, phone calls placed, phone calls answered, other electronic messages answered or sent, and any other activities recipient 114 manually performs on recipient electronic messaging device 130 during the wait time period. In some embodiments, electronic messaging server 120 can receive activity data indicative of the typing speed or message length for one or more messages created and sent by recipient 114. If recipient 114 is responding to other messages or creating new outgoing messages that are very short or typed very quickly, recipient 114 could be preoccupied, busy, or otherwise unable to respond to the delivered electronic message. Corresponding activity data can allow electronic messaging server 120 to determine recipient 114's level of attention or care given to other electronic messages, to estimate whether recipient 114 is too busy to respond.

In step 456, processor 456 collects environment data detected by one or more sensors 325 in recipient electronic messaging device 130. Environment data includes data about the surroundings of recipient electronic messaging device 130 during the wait time period such as, for example, an ambient light level, ambient noise level, In some embodiments device environment data also includes movement data collected from one or more activity sensors 325 in recipient electronic messaging device 130. For example, accelerometer, and GPS data detected by one or more sensors 325 indicates movement of the recipient electronic messaging device 130 and/or movement of the environment around recipient electronic messaging device 130 such as a moving car. Movement data may also indicate an orientation or altitude of recipient electronic messaging device 130.

In some embodiments, environment data can include data gathered from one or more biometric devices in communication with recipient messaging device 130, such as a heart rate sensor, posture sensor, pedometer, blood pressure monitor, galvanic skin response sensor, pulse oximetry sensor, and other sensors or devices capable of collecting and transmitting biometric data about recipient 114. In some embodiments, a wearable device can collect data related to recipient 114's level of alertness or sleep patterns throughout the day.

In step 457, electronic messaging server 120 compiles collected monitoring data, including device usage data and environmental data, and electronic messaging server 120 determines whether the wait time period has expired (step 458). If the wait time is reached and the wait time period has expired ("yes" in step 458), method 400 proceeds to step 460. If the wait time has not been reached and the wait time period has not expired ("no" in step 458), then method returns to step 453, in which the timer continues to run, and electronic messaging server 120 repeats steps 454-458, until the wait time period expires.

Figure 4E:
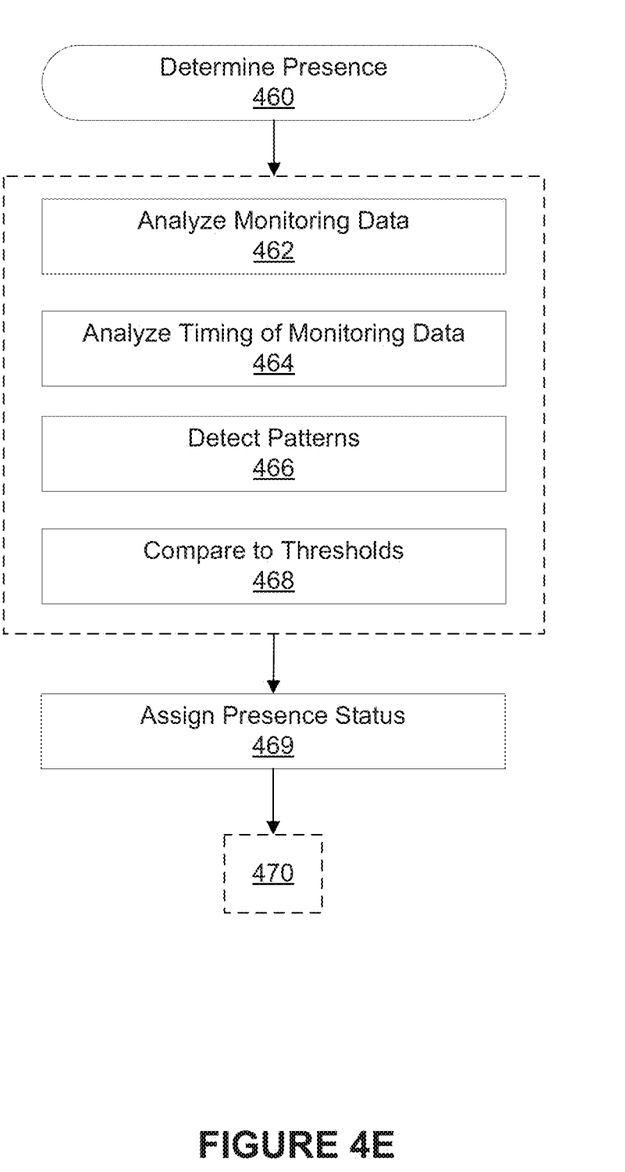

As illustrated in the example embodiment of FIG. 4E, in step 460, electronic messaging server 120 determines a presence status of recipient 114. Processor employs one or more analyses to determine a presence status, such as analyzing monitoring data (step 462), analyzing timing of monitoring data (step 464), detecting patterns (step 466), and/or comparing monitoring data to thresholds (step 468).

In step 462, electronic messaging server 120 analyzes the compiled monitoring data, such as by entering the monitoring data into one or more computer models, or applying one or more rule sets to the monitoring data. Electronic messaging server 120 also determines whether recipient 114 performed any activity on recipient electronic messaging device 130, such as performing an action associated with the attribute of the electronic message, or contacting a third party responsive to the electronic message, indicative of presence or absence, depending on the determined attribute of the electronic message. For example, if an urgent electronic message includes the phrase "call 911," and recipient calls 911 during the wait time period (but does not respond directly to the electronic message), electronic messaging server 120 can determine that recipient 114 is present because monitoring data indicated that recipient 114 acted in a manner responsive to the attribute of the electronic message. As another example, if an electronic message reads "I need a contract printed ASAP in a meeting room," a detected activity of printing a document from recipient messaging device 130 can indicate that recipient 114 is "available" and acting in response to the received electronic message.

In embodiments where monitoring data includes biometric data measured from recipient 114, electronic messaging server 120 can analyze the biometric data to determine whether recipient 114 is highly physically active, stressed, or sleeping. In some embodiments, electronic messaging server 120 can determine a sleep and/or activity pattern of recipient 114 over a period of time, to identify one or more time periods during which recipient 114 is usually sleeping or exercising, and is likely unavailable.

In some embodiments, electronic messaging server 120 can also utilize a determined sleep or activity pattern to modify a determined wait time (referring to step 451 in FIG. 4D). For example, electronic messaging server 120 can determine a longer wait time when recipient 114 is expected to be sleeping or exercising, based on the determined sleep or activity patterns. In such embodiments, electronic messaging server 120 can determine an appropriate wait time period based upon both an urgency level of an acquired electronic message, as well as recipient 114's current alertness or distraction level related to sleeping or exercising, respectively.

As another example, if recipient 114 is determined to be awake based on monitored biometric data, then electronic messaging server 120 can determine how near recipient 114 is to an expected sleeping time, based on historic sleeping patterns, and can increase a determined wait time period to compensate for an expected decreased level of alertness and a likely slower response, and to allow recipient 114 more time to respond before determining that recipient 114 is not present.

In step 464, electronic messaging server 120 analyzes the timing of monitoring data, such as by analyzing timestamps attached to particular data points, to ascertain the amount of activity or changes in the environment occurring immediately after the recipient electronic message device 130 received the electronic message, and the amount of activity and environment changes occurring at various times during the wait time period.

In step 466, electronic messaging server 120 detects patterns in the monitoring data, which may be indicative of recipient's presence or absence. Electronic messaging server 120 can recall historic monitoring data for recipient 114, and identify patterns of monitoring data indicative of the recipient being "present" and "not present." Electronic messaging server 120 can then analyze current monitoring data to determine whether any historic patterns are exhibited. In some embodiments, patterns may include sequences of activities, ambient noise, ambient light, acceleration, deceleration, altitudes, keystroke inputs, locations, and any other metrics detected by sensors 325 and/or derived from the monitoring data. In some embodiments, server 120 stores current and historic monitoring data in database 150 for regression analysis and for analysis to improve accuracy.

In step 468, electronic messaging server 120 compares monitoring data to one or more thresholds, such as comparing activity data to a threshold amount above which the recipient 114 is considered "present" and below which the recipient 114 is "not present." As another example, electronic messaging server 120 can determine whether recipient 114 answered a minimum threshold number of electronic messages during the wait time period, or initiated a minimum threshold number of new electronic messages during the wait time period, electronic messaging server 120 can determine that recipient 114 is "present."

In step 469, electronic messaging server 120 assigns a presence status for recipient 114, based on the analyses performed in steps 462-468. In some embodiments, electronic messaging server 120 combines results from different analysis steps and applies additional logic. For example, if monitoring data indicates an above-normal amount of movement, but device usage data indicates that recipient 114 performed no functions during the wait time period, electronic messaging server 120 can determine that recipient 114 is traveling, such as in a vehicle, and is likely "not present." Based on the results of the analyses steps 462-468 and optional additional combination analyses, electronic messaging server 120 determines a presence status. In some embodiments, electronic messaging server 120 performs a quantitative analysis by scoring the results of the analyses and compares the score to an associative array, thresholds, or rule sets. In other embodiments, electronic messaging server 120 performs a qualitative analysis to determine a presence status based on the analyses results.

In some embodiments, electronic messaging server 120 selectively assigns a presence status based in part on a determined topic of the received electronic message. For example recipient 114 can choose to not engage in responding to an electronic message related to a certain topic, such as a business or work matter, and electronic messaging server 120 can determine that recipient 114 is not present to sender 112 and other senders who are identified by electronic messaging server 120 as being work colleagues of recipient 114. Thus, electronic messaging server 120 can indicate that recipient 114 is present to some people (such as family members), and not present to others (such as coworkers).

After assigning a presence status (step 469), method 400 proceeds to step 470, in which electronic messaging server 120 provides an indication of the presence status to sender electronic messaging device 110 (described in detail with respect to FIG. 4A).

Those skilled in the relevant arts would recognize that the attribute-based presence determination methods and systems described herein could be used for purposes other than text-based electronic messages such as emails, instant electronic messages, and SMS electronic messages. For example, the systems and methods could be used in conjunction with voice-based electronic messages such as voicemails, including performing voice recognition analyses on a voicemail from a sender, and determining an attribute such as a content and/or context of the voicemail to assign an urgency level for the voicemail.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as non-limiting, with a true scope and spirit being indicated by the following claims and their full scope of equivalents.

What is claimed is:

1. A method for determining a presence status of an electronic message recipient, the method comprising:
  acquiring an electronic message from a sender;
  determining an attribute of the electronic message;
  assigning an urgency level based on the determined attribute of the electronic message;
  providing the electronic message for delivery to a receiving device associated with the recipient;
  monitoring activity of the receiving device after the electronic message is delivered; and
  determining a presence status of the recipient based on the determined urgency level and the monitored activity.

2. The method of claim 1, wherein the monitored activity corresponds to an input from the recipient to the recipient device in associated with the acquired electronic message.

3. The method of claim 2, wherein the input is associated with one or more of creating a response to the electronic message, performing an action associated with the determined attribute of the electronic message, or contacting a third party.

4. The method of claim 1, further comprising:
  providing an indication of the determined presence status to the sender.

5. The method of claim 1, wherein the determined attribute comprises a content of the electronic message, and the content comprises one or more words or numbers included in a body of the electronic message.

6. The method of claim 1, wherein the determined attribute comprises a context of the electronic message, and the context comprises a circumstance or inference associated with one or more words or numbers included in a body of the electronic message.

7. The method of claim 1, wherein the determined attribute comprises an urgency flag assigned to the electronic message by the sender.

8. The method of claim 1, wherein the determined attribute is based in part on a relationship between the sender and the recipient.

9. A non-transitory computer-readable medium storing instructions that are executable by at least one processor of a device to cause the device to perform a method for determining a presence status of an electronic message recipient, the method comprising:
  acquiring an electronic message from a sender;
  determining an attribute of the electronic message;
  assigning an urgency level based on the determined attribute of the electronic message;
  providing the electronic message for delivery to a receiving device associated with the recipient;
  monitoring activity of the receiving device after the electronic message is delivered; and determining a presence status of the recipient based on the determined urgency level and the monitored activity.

10. The non-transitory computer readable medium of claim 9, wherein the monitored activity corresponds to an input from the recipient to the recipient device in associated with the acquired electronic message.

11. The non-transitory computer readable medium of claim 10, wherein the input is associated with one or more of creating a response to the electronic message, or contacting a third party.

12. The non-transitory computer readable medium of claim 9, wherein the set of instructions that are executable by the at least one processor to cause the device to further perform:
   providing an indication of the determined presence status to the sender.

13. The non-transitory computer readable medium of claim 9, wherein the determined attribute comprises a content of the electronic message, and the content comprises one or more words or numbers included in a body of the electronic message.

14. The non-transitory computer readable medium of claim 9, wherein the determined attribute comprises a context of the electronic message, and the context comprises a circumstance or inference associated with one or more words or numbers included in a body of the electronic message.

15. A system for determining a presence status of an electronic message recipient, the system comprising:
   one or more memories having stored thereon computer-executable instructions; and
   one or more processors configured to execute the stored instructions to:
      acquire an electronic message from a sender;
      determine an attribute of the electronic message;
      assign an urgency level based on the determined attribute of the electronic message;
      provide the electronic message for delivery to a receiving device associated with the recipient;
      monitor activity of the receiving device after the electronic message is delivered; and
      determine a presence status of the recipient based on the determined urgency level and the monitored activity.

16. The system of claim 15, wherein the monitored activity corresponds to an input from the recipient to the recipient device in associated with the acquired electronic message.

17. The system of claim 16, wherein the input is associated with one or more of creating a response to the electronic message, or contacting a third party.

18. The system of claim 15, wherein the one or more processors are further configured to provide an indication of the determined presence status to the sender.

19. The system of claim 15, wherein the determined attribute comprises a content of the electronic message, and the content comprises one or more words or numbers included in a body of the electronic message.

20. The system of claim 15, wherein the determined attribute comprises a context of the electronic message, and the context comprises a circumstance or inference associated with one or more words or numbers included in a body of the electronic message.

* * * * *